(12) United States Patent
Kurlander et al.

(10) Patent No.: US 7,778,632 B2
(45) Date of Patent: Aug. 17, 2010

(54) MULTI-MODAL DEVICE CAPABLE OF AUTOMATED ACTIONS

(75) Inventors: David J. Kurlander, Seattle, WA (US); David W. Williams, Woodinville, WA (US); Yuan Kong, Kirkland, WA (US); Zhengyou Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 11/261,039

(22) Filed: Oct. 28, 2005

(65) Prior Publication Data

US 2007/0099602 A1    May 3, 2007

(51) Int. Cl.
  *H04M 3/00* (2006.01)
(52) U.S. Cl. .............. 455/418; 455/552.1; 455/414.3; 455/414.4; 455/66.1; 704/219; 348/61; 348/738
(58) Field of Classification Search .......... 455/418, 455/552.1, 414.3, 414.4, 66.1; 348/61, 738; 704/219
  See application file for complete search history.

(56) References Cited

U.S. PATENT DOCUMENTS

| | | | |
|---|---|---|---|
| 5,493,692 | A | 2/1996 | Theimer et al. |
| 5,544,321 | A | 8/1996 | Theimer et al. |
| 5,555,376 | A | 9/1996 | Theimer et al. |
| 5,603,054 | A | 2/1997 | Theimer et al. |
| 5,611,050 | A | 3/1997 | Theimer et al. |
| 5,812,865 | A | 9/1998 | Theimer et al. |
| 6,466,232 | B1 | 10/2002 | Newell et al. |
| 6,513,046 | B1 | 1/2003 | Abbott, III et al. |
| 6,549,915 | B2 | 4/2003 | Abbott, III et al. |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 2001/0040590 | A1 | 11/2001 | Abbott et al. |

(Continued)

FOREIGN PATENT DOCUMENTS

WO    9800787    1/1998

OTHER PUBLICATIONS

Andy Harter, et al., A Distributed Location System for the Active Office, IEEE Network, 1994, pp. 62-70.

(Continued)

*Primary Examiner*—Vincent P Harper
*Assistant Examiner*—Fred A Casca
(74) *Attorney, Agent, or Firm*—Lee & Hayes, PLLC

(57) ABSTRACT

A multi-modal multi-lingual mobile device that facilitates intelligently automating an action. The device can automatically synchronize a user schedule based upon a user state, intention, preference and/or limitation. The device can employ sensors to automatically detect criteria by which to automatically implement an action. Moreover, the system can interrogate a user thus converging upon a user intention and/ or preference. An analyzer component can intelligently evaluate the compiled criterion in order to automatically perform an action. The multi-modal multi-lingual mobile device can automatically facilitate identification of an individual. Other actions that are automatically performed can include modifying personal information manager data, translating languages into a language comprehendible to a user, etc. Implementation of these actions can be based at least in part upon an environmental factor, a conversation, a location factor and a temporal factor.

19 Claims, 11 Drawing Sheets

U.S. PATENT DOCUMENTS

| | | | |
|---|---|---|---|
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0014254 | A1* | 1/2003 | Zhang et al. ............... 704/260 |
| 2003/0046401 | A1 | 3/2003 | Abbott et al. |
| 2003/0131059 | A1* | 7/2003 | Brown et al. ............... 709/206 |
| 2003/0154476 | A1 | 8/2003 | Abbott, III et al. |
| 2003/0171932 | A1* | 9/2003 | Juang et al. ............... 704/276 |
| 2004/0157624 | A1* | 8/2004 | Hrastar ............... 455/456.1 |
| 2004/0201784 | A9* | 10/2004 | Dagtas et al. ............... 348/738 |
| 2004/0254787 | A1* | 12/2004 | Shah et al. ............... 704/219 |
| 2005/0034078 | A1 | 2/2005 | Abbott et al. |
| 2005/0240404 | A1* | 10/2005 | Gurram et al. ............... 704/231 |
| 2006/0009973 | A1* | 1/2006 | Nguyen et al. ............... 704/257 |
| 2006/0053009 | A1* | 3/2006 | Jeong et al. ............... 704/234 |
| 2006/0092274 | A1* | 5/2006 | Good ............... 348/61 |
| 2007/0022135 | A1* | 1/2007 | Malik ............... 707/102 |
| 2007/0043566 | A1* | 2/2007 | Chestnut et al. ............... 704/257 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In the 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for U.S. Appl. No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

MULTI-MODAL DEVICE CAPABLE OF AUTOMATED ACTIONS

BACKGROUND

Both enterprises and individuals are increasingly interested in using handheld devices. Most modern handheld devices are equipped with multiple sensors (e.g., microphone, wireless transmitter, global positioning system (GPS) engine, camera, stylus, etc.). However, there are no applications available that make full use of these multiple sensors. In other words, multi-sensory technologies that make handheld devices a multi-modal multi-lingual mobile assistant are not available.

Today, cellular telephones running on state-of-the-art operating systems have increased computing power in hardware and increased features in software in relation to earlier technologies. For instance, cellular telephones are often equipped with built-in digital image capture devices (e.g., cameras) and microphones together with computing functionalities of personal digital assistants (PDAs). Since these devices combine the functionality of cellular phones with the functionality of PDAs, they are commonly referred to as "smart-phones."

The hardware and software features available in these smart-phones and similar technologically capable devices provide developers the capability and flexibility to build applications through a versatile platform. The increasing market penetration of these portable devices (e.g., PDAs) inspires programmers to build applications, Internet browsers, etc. for these smart-phones.

The Internet continues to make available ever-increasing amounts of information which can be stored in databases and accessed therefrom. Additionally, with the proliferation of portable terminals (e.g., notebook computers, cellular telephones, PDAs, smart-phones and other similar communication devices), users are becoming more mobile, and hence, trackable and predictable. For example, many devices are being designed with a geographic location tracking technology such as GPS for reasons of safety, finding travel destinations, etc. Thus, it now becomes possible to determine the location of the user. This location together with other accessible data can be valuable to augmenting services within a portable device.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a multi-modal multi-lingual mobile device that facilitates automating an action based upon gathered and/or input criterion. In one aspect, the device can automatically synchronize a user schedule based upon a user state, intention, preference and/or limitation. The device can automatically detect criteria by which to automatically implement an action. Sensors can be employed to automatically detect implementation criteria thereby enabling the device to intelligently determine an action to automatically execute. Moreover, in another aspect, the system can interrogate a user thus converging upon an intention and/or preference with respect to automating an action or series of actions.

In accordance therewith, an analyzer component can intelligently evaluate criterion and factors that are compiled and/or received in order to automatically perform an action. In one particular aspect, the multi-modal multi-lingual mobile device can facilitate identification of an individual based upon information gathered via sensors (e.g., optics, audio, facial/speech recognition). In another particular aspect, the system can automatically manipulate a schedule based upon an environmental context, a user state, a user preference or a user limitation.

In still other aspects, actions that are automatically performed can include modifying personal information manager (PIM) data (e.g., contacts, schedules, tasks), identifying individuals, translating languages into a language comprehendible to a user, suggesting places to visit, etc. Implementation of these actions can be based at least in part upon an environmental context, a conversation context, a location context and a temporal context.

In other aspects, the multi-modal multi-lingual mobile device can employ artificial intelligence (AI) reasoning/learning techniques and rules-based logic techniques to facilitate evaluation of and/or obtaining the criterion. In a particular AI aspect, the system can employ a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
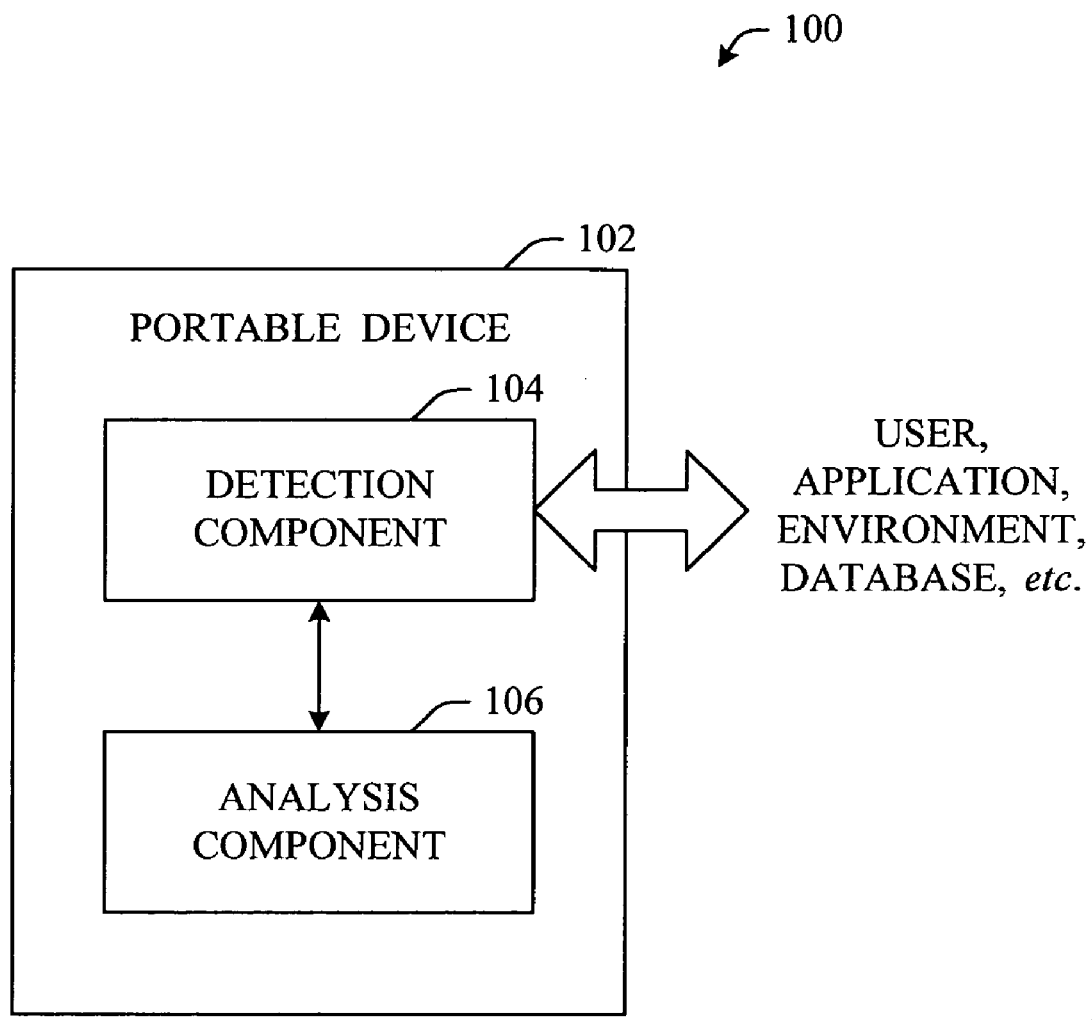
FIG. 1 illustrates a system that facilitates automatically performing an action in accordance with an aspect of the innovation.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to the drawings, FIG. 1 illustrates a system 100 that facilitates automating actions with respect to a portable device 102. Generally, the portable device 102 can include a detection component (e.g., sensor) 104 and an analysis component 106. In operation, portable device 102 can employ detection component 104 and analysis component 106 (e.g., machine learning) to facilitate taking automated actions. By way of example, PIM (personal information manager) data can be automatically synchronized based upon a variety of factors. Factors can include, but are not intended to be limited to, user state, user intention, user preference, environmental conditions, user limitations, time, date, etc.

Although aspects described herein are directed to smartphones, it is to be appreciated that, in accordance with alternate aspects of the invention, portable device 102 can be any portable communication and/or computing device. By way of example and not limitation, portable device 102 can be a cellular telephone, pocket computer, laptop, personal data assistant (PDA) or the like.

Figure 2:
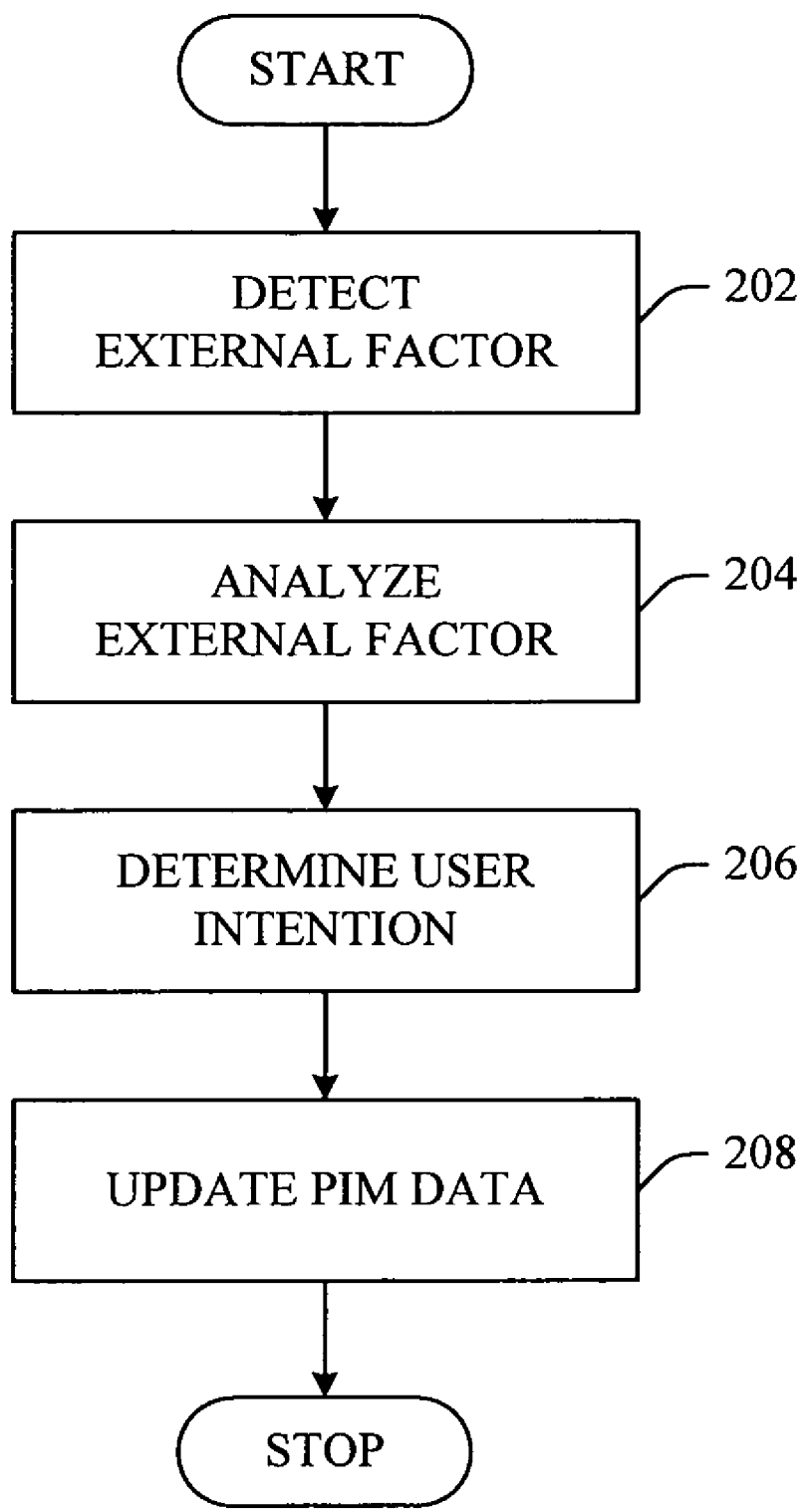
FIG. 2 illustrates an exemplary flow chart of procedures that facilitate evaluation of factors to determine a user intention in accordance with an aspect of the novel subject matter.

FIG. 2 illustrates a methodology of automating an action in accordance with an aspect of the invention. More particularly, the methodology of FIG. 2 describes a process of updating PIM data (e.g., contacts, schedules, tasks, journals) in accordance with a user preference. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 202, an external factor is detected. By way of example, in one exemplary aspect a global positioning system (GPS) can be employed to determine a present location. In another example, optics (e.g., image capture device) can be employed to determine a present location. For example, an image capture device can be employed to capture an image of signage thereafter, analyzing the content of the signage to determine a location.

Thereafter, at 204, the detected criterion/factor/data can be analyzed. In accordance with the examples described above, upon analyzing the factors, the system can determine the physical location as well as people, places, events, etc. in proximity to the detected location. More particularly and by way of further example, in the instance of signage, the image can be analyzed to decipher text, images as well as criterion not visible to the human eye that are included or embedded within the sign. Once identified, the criterion can be employed to determine a present location.

Based upon the gathered information together with other criterion, a user intention can be determined at 206. For example, based upon existing PIM data (e.g., contacts, appointments) the system can take an automated action such as updating PIM data (e.g., schedule). More specifically, at 208, based upon the user intention/preference the system can modify PIM data, for example, by adding an appointment into a user's schedule data, adding a contact(s), adding a task, updating a journal, etc.

Figure 3:
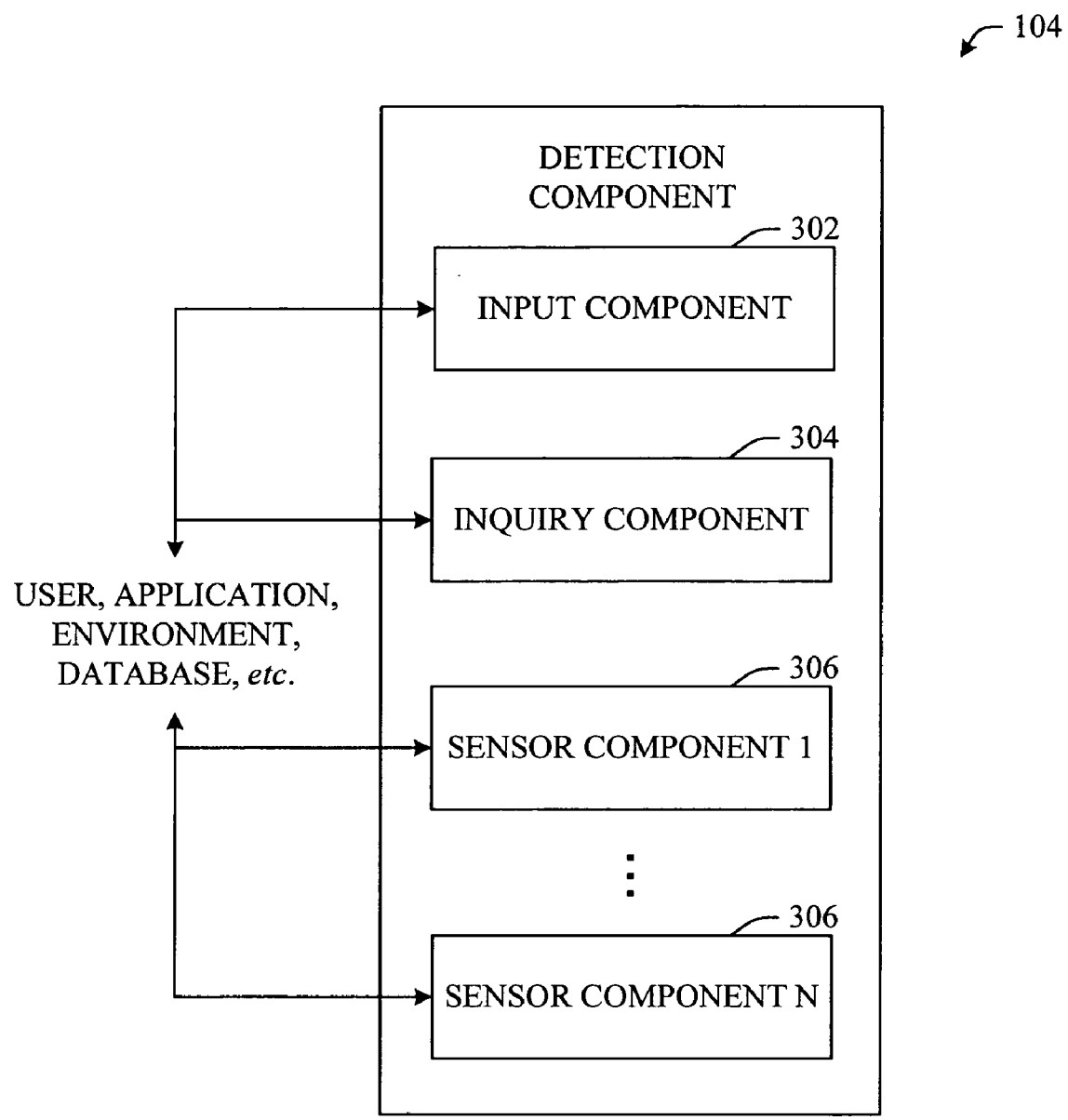
FIG. 3 illustrates a block diagram of a detection component that facilitates accepting, inquiring, and sensing to obtain criterion in accordance with an aspect of the novel innovation.

Turning now to FIG. 3, a block diagram of detection component 104 is shown. Generally, detection component 104 can include an input component 302, inquiry component 304 and 1 to N sensor components 306. It is to be understood and appreciated that 1 to N sensor components can be referred to individually or collectively as sensor components 306. In operation, the detection component 104 can compile information/criterion which can later be analyzed by the analysis component (106 shown in FIG. 1) to prompt automated action.

In accordance with aspects of the subject invention, the detection component 104 can facilitate gathering information, criterion and/or data which can be employed to perform an automated action based upon preference, logic, reasoning or other desired analysis. For example, the system can facilitate automatic creation and/or modification of PIM data. In a more specific example, based at least in part upon information gathered via the detection component, the system can automatically schedule calendar entries such as appointments, tasks, etc. For instance, the system can employ a microphone and, through speech analysis techniques, can automatically schedule an appointment upon analyzing the voices as well as keywords included within the conversation. In another example, the system can employ a microphone and/or optic sensor to determine an identity of an individual.

Figure 4:
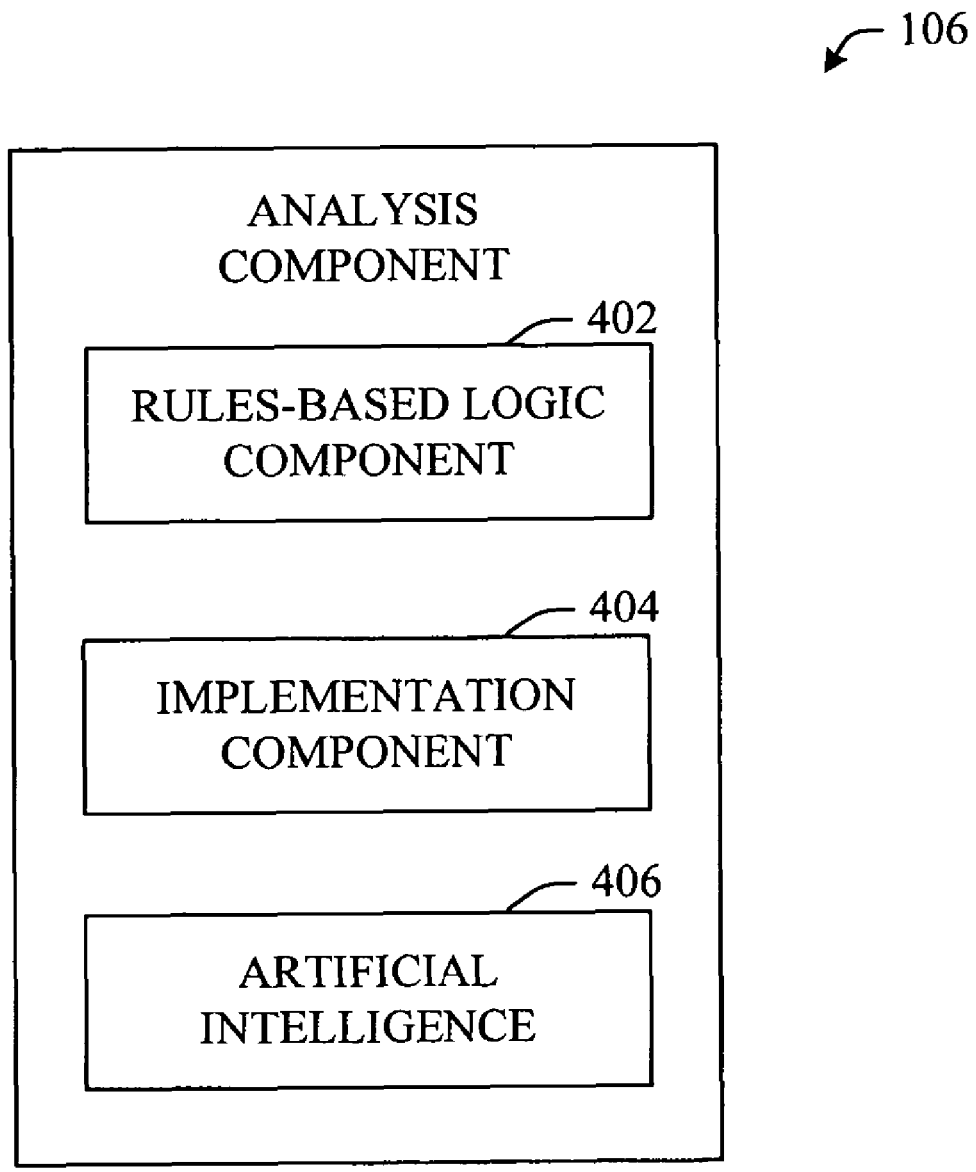
FIG. 4 illustrates a block diagram of an analysis component in accordance with an aspect of the innovation.

FIG. 4 illustrates an exemplary analysis component 106 in accordance with an aspect of the invention. Although the aspects disclosed herein describe the incorporation of the automated functionality into a portable device, it is to be appreciated that the novel functionality of the invention can be a stand alone device (e.g., not incorporated into a communication device).

With continued reference FIG. 4, analysis component 106 can include a rules-based logic component 402 as shown. Accordingly, an implementation scheme (e.g., rule) can be applied to define and/or implement an automatic action. It will be appreciated that the rule-based implementation can automatically and/or dynamically prompt execution of an action based upon a defined and/or programmed rule. In response thereto, the rule-based implementation can automatically prompt execution of an action (e.g., update PIM data) by employing a predefined and/or programmed rule(s) based upon any desired criteria (e.g., audio, visual, environmental, user defined . . . ).

By way of example, a user can establish a rule that can prompt automatic identification of an individual. In this exemplary aspect, the rule can be constructed to process various factors such as voice analysis, optical analysis, location, time, etc. in accordance with a predetermined rule (e.g., algorithm). Thereafter, based upon the algorithmic result together with a desired degree of certainty, the system can, via implementation component 404, return a determination of the identity of an individual. It will be appreciated that any of the functionalities utilized in accordance with the subject invention can be programmed into a rule-based implementation scheme.

In the another exemplary aspect, the rules-based logic component 402 can be programmed or configured in accordance with a specific hardware configuration or in accordance with a software application. For example, a rule can be constructed in accordance with specific memory capacity and/or display of a device. In other words, a rule can be established to take into consideration the specific limitations of a hardware device (e.g., processing speed). Thus, in one aspect, if a specific handheld device has a substantially slow processor, a rule can be generated to ignore and not consider certain criteria in an analysis—thus maximizing efficiency of such a processor.

With further reference to FIG. 4, in addition to or in place of rules-based logic component 402, analysis component 106 can include an artificial intelligence (AI) component 406 which facilitates automating one or more features in accordance with the subject invention. The subject invention (e.g., in connection with analysis) can employ various AI-based schemes for carrying out various aspects thereof. For example, a process for identifying an individual, determining when/if/how to update PIM data, etc. can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of individual identification, for example, attributes can be words or phrases or other data-specific attributes derived from the words or phrases (e.g., keywords), and the classes can be categories or contact types.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria an individual's identity, when/if/how to create/update a contact entry, when/if to update a schedule entry, etc.

Figure 5:
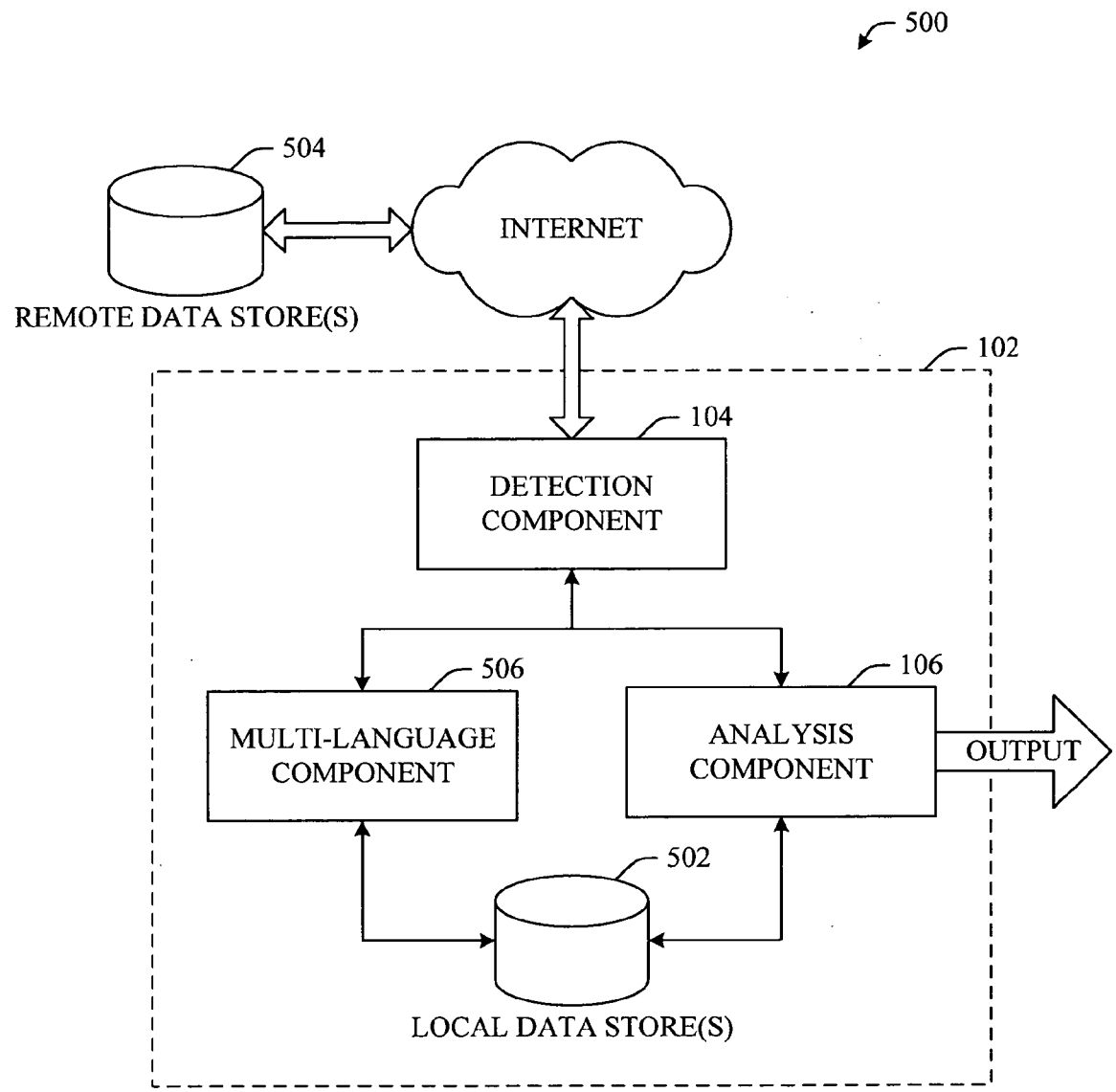
FIG. 5 illustrates a multi-language system that facilitates automatically executing an action in accordance with an aspect of the innovation.

FIG. 5 illustrates another system 500 that facilitates automatically performing an action in response to criteria obtained either via sensory techniques and/or input. Generally, system 500 includes a portable device 102 that can employ local data store(s) 502 and/or remote data source(s) 504 to automatically perform an action. Additionally, system 500 can employ a multi-language component 506 capable of translating data. In operation, the multi-language component 506 can receive speech (or text data) data from the detection component 104 and thereafter assist the analysis component 106 by translating the input signal into a language recognizable to a user and/or application.

As described earlier with reference to FIG. 3, detection component 104 can discover criteria through techniques including user/application input, inquiry, sensor, etc. Once obtained, the analysis component 106 can process the criteria thereafter automatically determining and performing an action based upon the gathered criteria and/or state information. It is to be appreciated that the criteria can be gathered via local and/or remote data stores (502, 504). Additionally, via sensory techniques, criteria can be gathered via external and/or environmental factors. Some exemplary techniques of gathering information will be discussed in greater detail with reference to FIG. 6 that follows.

Figure 6:
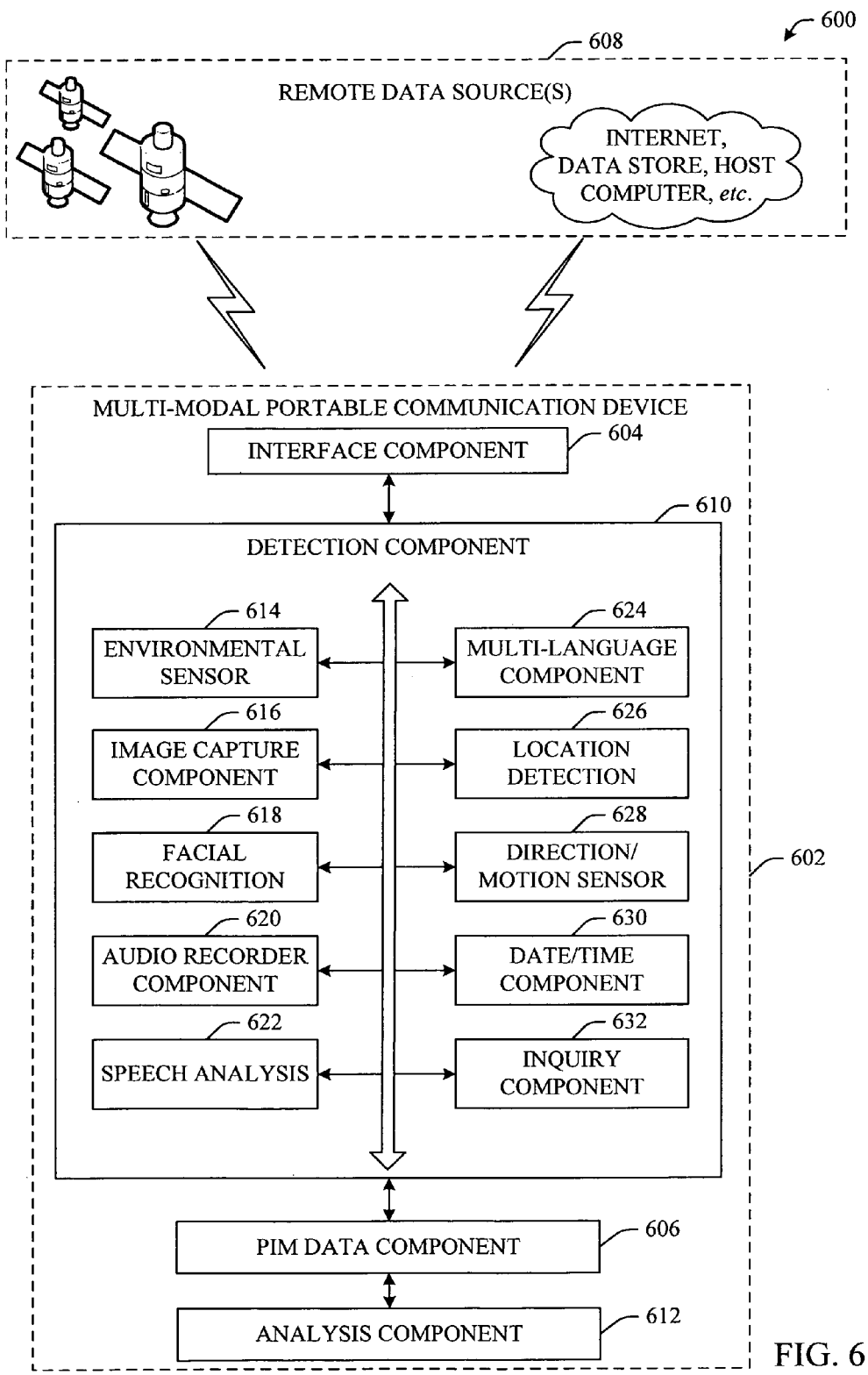
FIG. 6 is a schematic block diagram of a device having a variety of sensors/components and capable of automating actions in accordance with one aspect of the subject innovation.

FIG. 6 illustrates a system 600 that facilitates automating actions via a multi-modal mobile communication device. Generally, system 600 can include a multi-modal portable communication device 602 capable of detecting external criteria and/or state as well as receiving criteria by input and/or inquiry. As illustrated, the multi-modal portable communication device 602 can include an interface component 604 which facilitates obtaining criteria and/or state data from one or more local and/or remote data sources(s) (e.g., 606, 608).

In the aspect of FIG. 6, local data sources can include PIM data component 606. As well, remote data sources can include Internet services, data stores, host computers, satellites, etc. It is to be understood and appreciated that the system can employ a detection component 610 that obtains information (e.g., state data, criterion) and transfers the obtained information to an analysis component 612 for processing.

The analysis component 612 can be employed to process the gathered information thus prompting an automated action (e.g., PIM data creation/modification, individual identification).

Turning now to a discussion of the detection component 610, an exemplary set of information/data/state gathering components are shown (e.g., 614-632). Each of the set of information/data/state gathering components will be discussed with reference to exemplary scenarios that follow. It is to be understood that the scenarios described herein are included to provide perspective to the novel functionality of the multi-modal portable communications device. Other novel scenarios exist and are to be included within the scope of this disclosure and claims appended hereto.

In operation, detection component 610 can sense environmental factors/conditions (e.g., weather, pollution) via environmental sensor 614 thus establishing an environmental context. This environmental context can be combined and/or analyzed with other data/criterion thus prompting an automated action. By way of example, the environmental sensor component 614 can sense current weather conditions, interrogate the PIM data component 606 and, through the use of the analysis component 612, can create/revise a schedule entry accordingly.

More specifically, suppose an entry exists in the PIM data component on a given day which indicates attending a baseball game. Further, suppose the environmental sensor component 614 discovers heavy rain just prior to the start of the baseball game. In response thereto, the multi-modal portable device, upon analyzing the gathered information, can take an automated action such as adjusting (e.g., postponing) the schedule entry, canceling the schedule entry, modifying the schedule entry or even suggesting that a user to take an umbrella if still planning on attending the game.

In another exemplary scenario, an image capture component 616 (e.g., camera, scanner) can be employed to obtain information with which the analysis component 612 can prompt an automated action. For example, when storing a contact in PIM data, a user can also store an image of the contact. Accordingly, upon confronting an individual, the image capture device 616 can be employed together with a facial recognition component 618 to link a current image to a contact in the PIM data component 606. It is to be appreciated that other image analysis techniques can be employed to link the current image to a stored image thereby reminding a user of an identity of a subject individual. Moreover, it is to be understood that external data sources 608 can be employed to obtain comparative data thus assisting the analysis component 612 in the identification of an individual.

Similarly, a microphone or other audio recorder component 620 can be employed to capture audio of an individual. Accordingly, a speech analysis component 622 can be employed to analyze the voice of the individual, thus identification can be accomplished. Additionally, as described supra, a multi-language component 624 can be employed to translate the speech into a language comprehendible to a user.

In still another scenario, speech can analyzed thus enabling an automated action. By way of example, a user can speak into the device 602 or the device can actively or passively listen for speech thereafter analyzing the speech to determine a conversation context. This context can be input into the analysis component 612 together with other criterion (e.g., PIM data, environmental sensor data) thus prompting an automated action such as schedule creation/modification, suggested future actions (e.g., restaurant suggestions, event suggestions) based at least in part upon the conversation context (e.g., keywords).

Yet another scenario is directed to a multi-modal portable communications device 602 that can employ a location detection component 626 and/or a direction/motion sensor component 628 to establish a location context with respect to a device 602 location. By way of example, a global position system (GPS) can be employed as a location detection component 626 to determine a present location context. As well, an accelerometer, compass or other suitable mechanism can be employed as a direction/motion sensor 628 to provide geographical and other location context information. As described with reference to the other detection sub-components (e.g., 614-626), this contextual information can be combined with information from other modalities thereby enabling the analysis component 612 to prompt an automated action. Moreover, temporal context information can be provided via the data/time component 630. This temporal context information can further be factored into an analysis of the gathered data and/or contextual information.

As stated earlier, an inquiry component 632 can be provided that enables the system 600 to gather additional information in order to effect automated action. For example, the inquiry component 632 can be employed to gather addition contextual data thereby increasing the probability of an inference of a user action, preference and/or desire. In another example, the inquiry component can prompt a user of suggested actions prior to commencing a particular action. For example, in the ballgame scenario above, the inquiry component can suggest to a user to take an umbrella and likewise ask a user if a search of alternate (e.g., indoor) venues to watch the event are desired.

It is to be appreciated that the scenarios are endless for which the device 602 can take and/or suggest automated action. As such, it is to be understood that additional scenarios exist and are to be included into the scope of this disclosure and claims appended hereto. Moreover, those skilled in the art will understand and appreciate that other types of information can be gathered via components/sensors which can be utilized by the analysis component 612 to prompt automated action(s). These additional components/sensors are to be included within the scope of this disclosure and claims appended hereto.

Returning to a discussion of the multi-language component 624, the optional multi-language component 624 can be employed to translate and/or convert detected voice data into a language comprehendible to a user or receiver of the service output. For example, a GPS system (e.g., 608, 626) can be employed to determine a relevant location of the multi-modal portable communication device 602. This determined location can be employed to identify an appropriate language and/or dialect thus effecting comprehendible communications/conversion. As stated supra, it is to be appreciated that multi-modal communication device 602 can include, but is not limited to, a cellular telephone, PDA, smart-phone, pocket computer, laptop computer or the like.

Again, it is to be understood that the aforementioned sensor/component list is not to be considered exhaustive. Rather, this list is to be considered exemplary and it should be understood that other sensors/components can be integrated into the multi-modal portable communication device 602 to gather contextual information to assist in intelligently prompting an automated action without departing from the spirit and scope of the disclosure and claims appended hereto.

Figure 7:
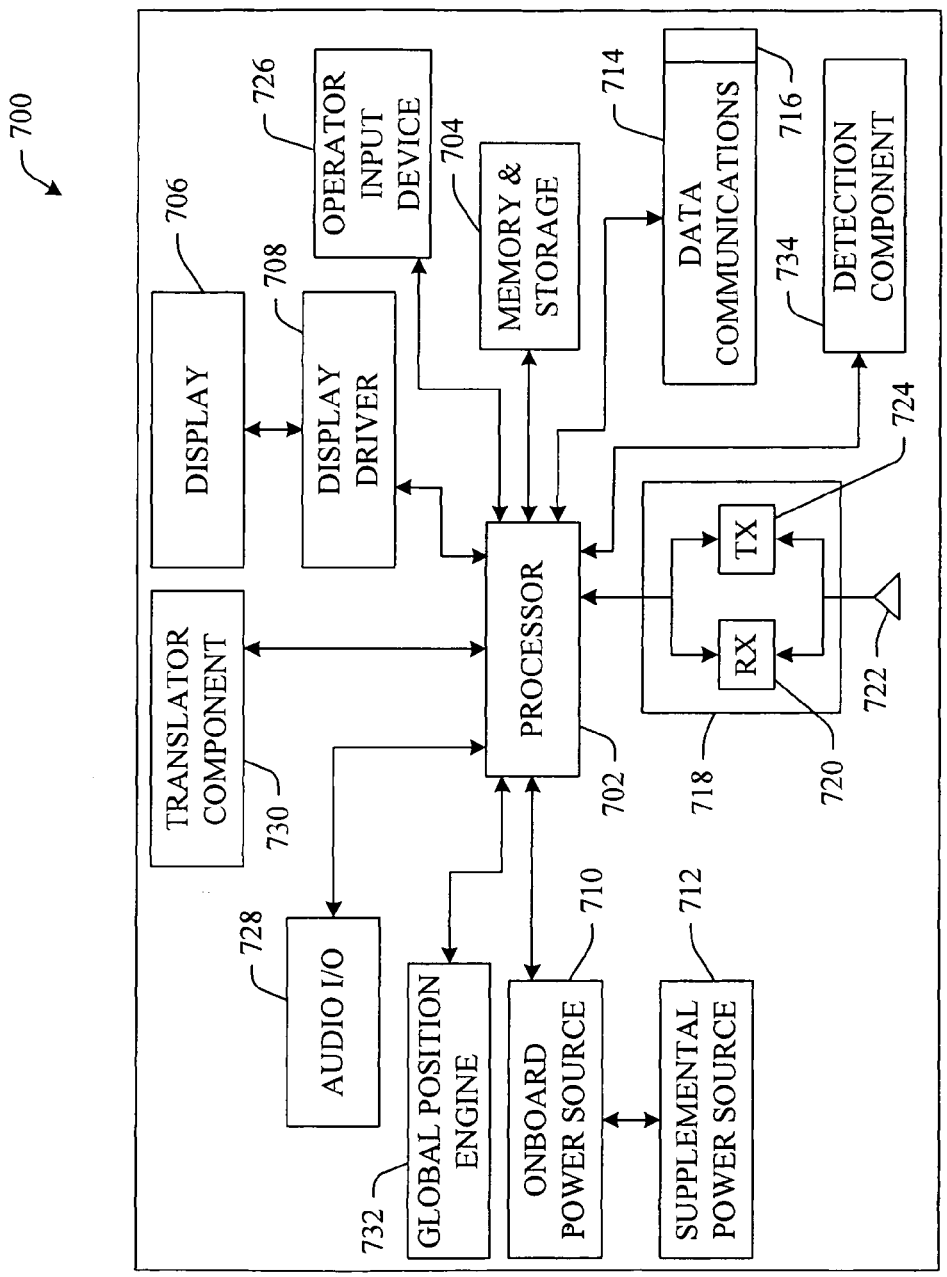
FIG. 7 illustrates an architecture of a multi-modal portable communication device that facilitates automating an action in accordance with an aspect.

Referring now to FIG. 7, there is illustrated a schematic block diagram of a portable multi-modal multi-lingual handheld device 700 according to one aspect of the subject invention, in which a processor 702 is responsible for controlling the general operation of the device 700. The processor 702 can be programmed to control and operate the various components within the device 700 in order to carry out the various novel analysis functions described herein. The processor 702 can be any of a plurality of suitable processors. The manner in which the processor 702 can be programmed to carry out the functions relating to the subject invention will be readily apparent to those having ordinary skill in the art based on the description provided herein.

A memory and storage component 704 connected to the processor 702 serves to store program code executed by the processor 702, and also serves as a storage means for storing information such as PIM data, current locations, inferred target locations, user/device states or the like. The memory and storage component 704 can be a non-volatile memory suitably adapted to store at least a complete set of the information that is acquired. Thus, the memory 704 can include a RAM or flash memory for high-speed access by the processor 702 and/or a mass storage memory, e.g., a micro drive capable of storing gigabytes of data that comprises text, images, audio, and video content. According to one aspect, the memory 704 has sufficient storage capacity to store multiple sets of information, and the processor 702 could include a program for alternating or cycling between various sets of gathered information.

A display 706 is coupled to the processor 702 via a display driver system 708. The display 706 can be a color liquid crystal display (LCD), plasma display, touch screen display, 3-dimensional (3D) display or the like. In one example, the display 706 is a touch screen display. The display 706 functions to present data, graphics, or other information content. Additionally, the display 706 can render a variety of functions that are user selectable and that control the execution of the device 700. For example, in a touch screen example, the display 706 can render touch selection icons that facilitate user interaction for control and/or configuration. In another aspect, display 706 is a 3D display that can augment and enhance visual qualities thereby making the visuals more true to form.

Power can be provided to the processor 702 and other components forming the hand-held device 700 by an onboard power system 710 (e.g., a battery pack or fuel cell). In the event that the power system 710 fails or becomes disconnected from the device 700, a supplemental power source 712 can be employed to provide power to the processor 702 (and other components (e.g., sensors, image capture device, . . . )) and to charge the onboard power system 710, if a chargeable technology. For example, the alternative power source 712 can facilitate an interface to an external grid connection via a power converter (not shown). The processor 702 of the device 700 can induce a sleep mode to reduce the current draw upon detection of an anticipated power failure.

The device 700 includes a communication subsystem 714 that includes a data communication port 716 (e.g., interface component 604 of FIG. 6), which is employed to interface the processor 702 with a remote computer, server, service, or the like. The port 716 can include at least one of Universal Serial Bus (USB) and/or IEEE 1394 serial communications capabilities. Other technologies can also be included, but are not limited to, for example, infrared communication utilizing an infrared data port, Bluetooth™, Wi-Fi, Wi-Max, etc.

The device 700 can also include a radio frequency (RF) transceiver section 718 in operative communication with the processor 702. The RF section 718 includes an RF receiver 720, which receives RF signals from a remote device via an antenna 722 and can demodulate the signal to obtain digital information modulated therein. The RF section 718 also includes an RF transmitter 724 for transmitting information (e.g., data, services) to a remote device, for example, in response to manual user input via a user input (e.g., a keypad, voice activation) 726, or automatically in response to the completion of a location determination or other predetermined and programmed criteria.

The transceiver section 718 can facilitate communication with a transponder system, for example, either passive or active, that is in use with location-based data and/or service provider components. The processor 702 signals (or pulses) the remote transponder system via the transceiver 718, and detects the return signal in order to read the contents of the detected information. In one implementation, the RF section 718 further facilitates telephone communications using the device 700. In furtherance thereof, an audio I/O subsystem 728 is provided and controlled by the processor 702 to process voice input from a microphone (or similar audio input device). The audio I/O subsystem 728 and audio output signals (from a speaker or similar audio output device). A translator component 730 can further be provided to enable multilingual/multi-language functionality of the device 700.

The device 700 can employ a global position engine 732 which can generate location context information. This location context information can be combined by processor 702 with other contextual information (e.g., environmental, conversational, temporal) provided via a detection component 734 thus prompting an automated action as described in greater detail supra.

Figure 8:
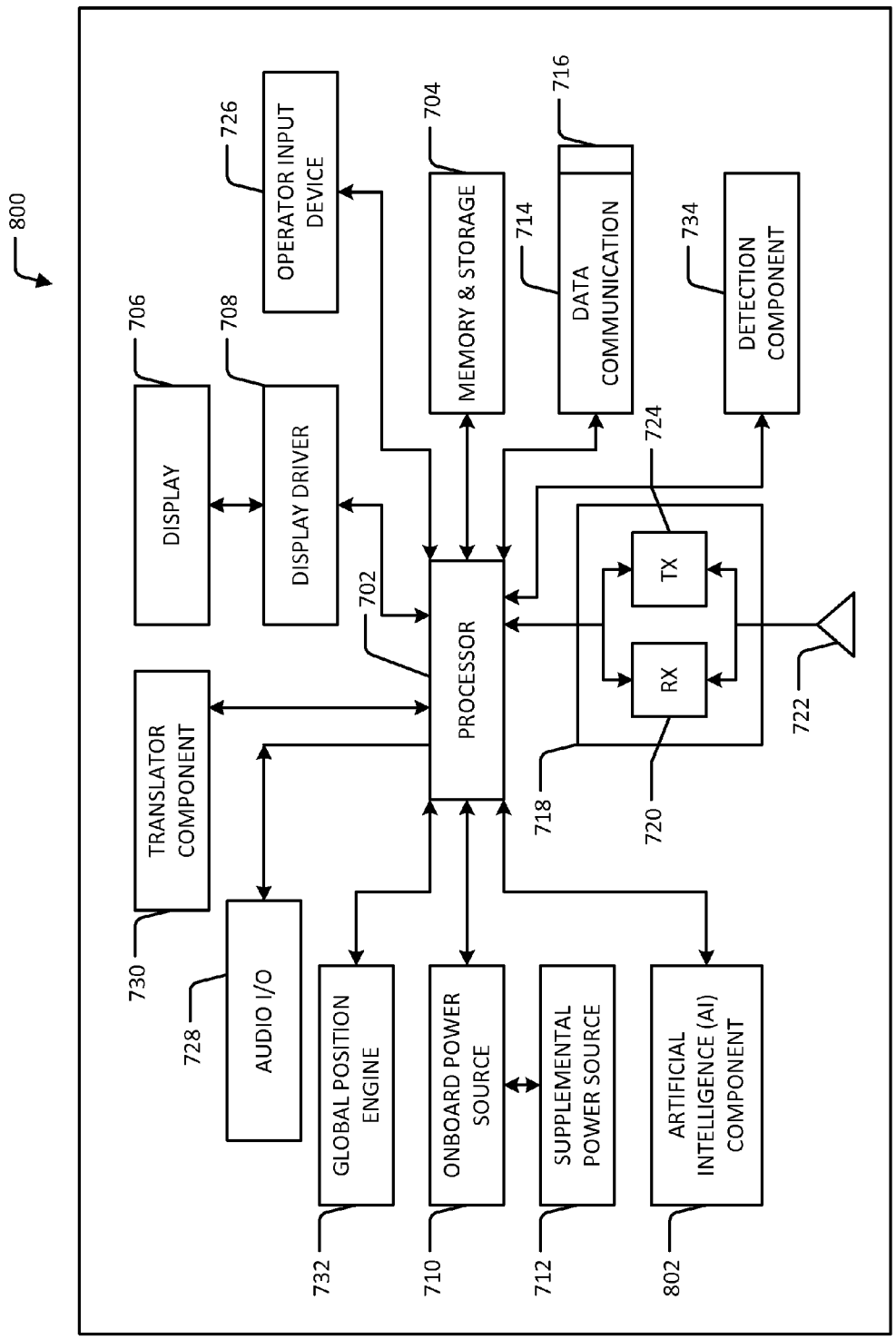
FIG. 8 illustrates an architecture of a portable handheld device including an artificial intelligence reasoning component that can automate functionality in accordance with an aspect of the innovation.

FIG. 8 illustrates a system 800 that employs artificial intelligence (AI) component 802 which facilitates automating one or more features in accordance with the subject invention. The subject invention (e.g., with respect to prompting an automated action, selecting an automated action, . . . ) can employ various AI-based schemes for carrying out various aspects thereof. For example, probabilistic and/or statistical-based analysis can be employed to effect inferring a user intention and/or preference. Examples of AI techniques are described in greater detail supra. Additionally, it is to be understood and appreciated that any AI mechanisms and/or reasoning techniques known in the art can be incorporated into the aspects described herein. These additional AI mechanisms and/or reasoning techniques are to be included within the scope of this disclosure and claims appended hereto.

As will be readily appreciated from the subject specification, the subject device 800 can employ classifiers that are explicitly trained (e.g., via a generic training data) as well as implicitly trained by using methods of reinforcement learning (e.g., via observing user behavior, observing trends, receiving extrinsic information). Thus, the subject invention can be used to automatically learn and perform a number of functions, including but not limited to determining, according to a predetermined criteria, information to gather, an appropriate/acceptable probability of error, when/if to perform an action, which action to select, a user preference, etc.

Figure 9:
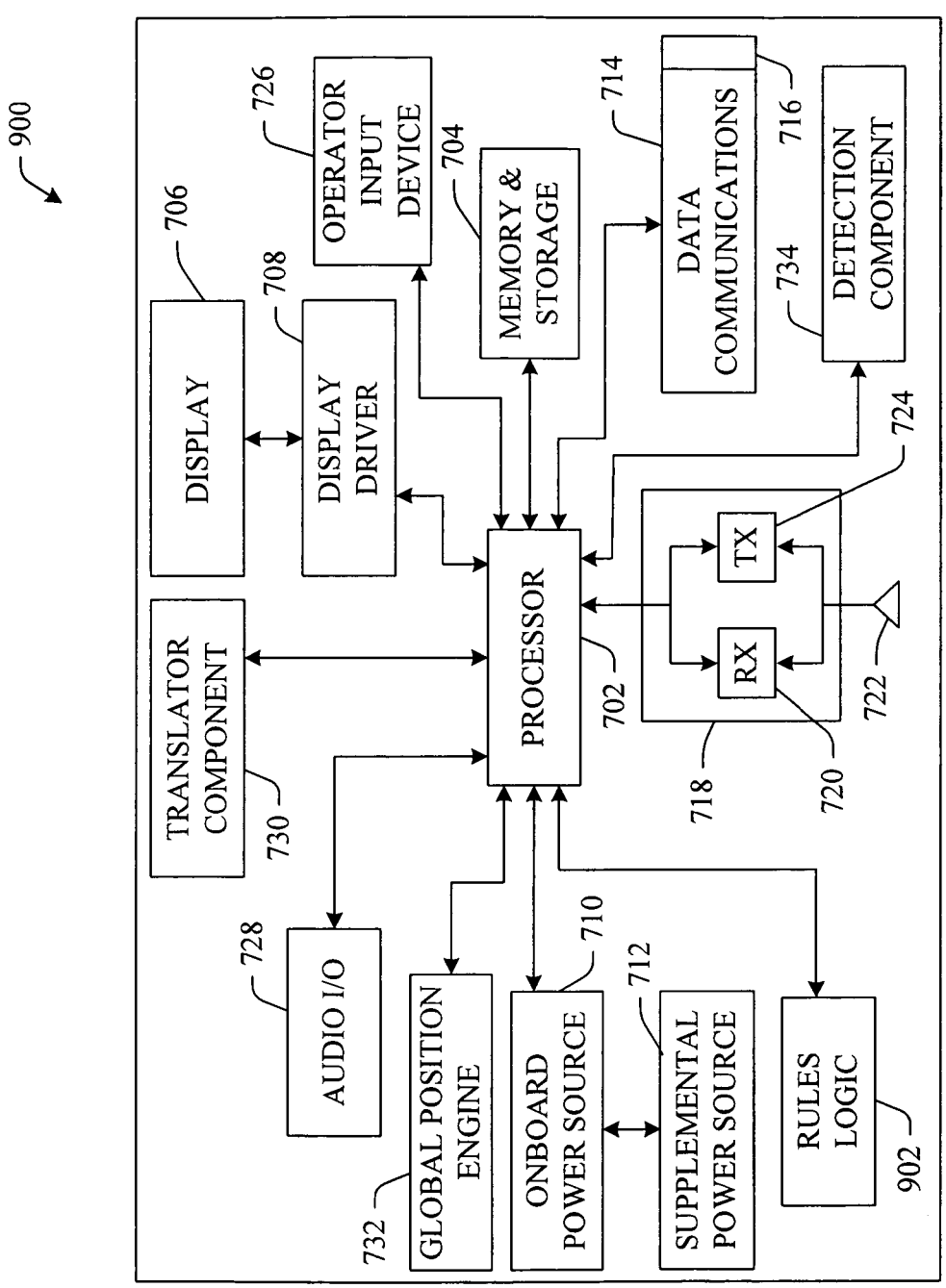
FIG. 9 illustrates an architecture of a portable handheld device including a rules-based logic component that can automate functionality in accordance with an aspect of the innovation.

With reference now to FIG. 9, an alternate aspect of the invention is shown. More particularly, handheld device 900 generally includes a rules-based logic component 902. In accordance with this alternate aspect, an implementation scheme (e.g., rule) can be applied to define acceptable probabilities, gather information, locate information, determine an action to automate, etc. By way of example, it will be appreciated that the rules-based implementation of FIG. 9 can automatically determine an order of sources by which to search for relevant information. Accordingly, in one aspect, the rules-based implementation can effect interrogating local sources prior to external sources (or vice versa) by employing a predefined and/or programmed rule(s). It is to be appreciated that any of the specifications and/or functionality utilized in accordance with the subject invention can be programmed into a rule-based implementation scheme. It is also to be appreciated that this rules-based logic can be employed in addition to, or in place of, the AI reasoning techniques described with reference to FIG. 8.

Figure 10:
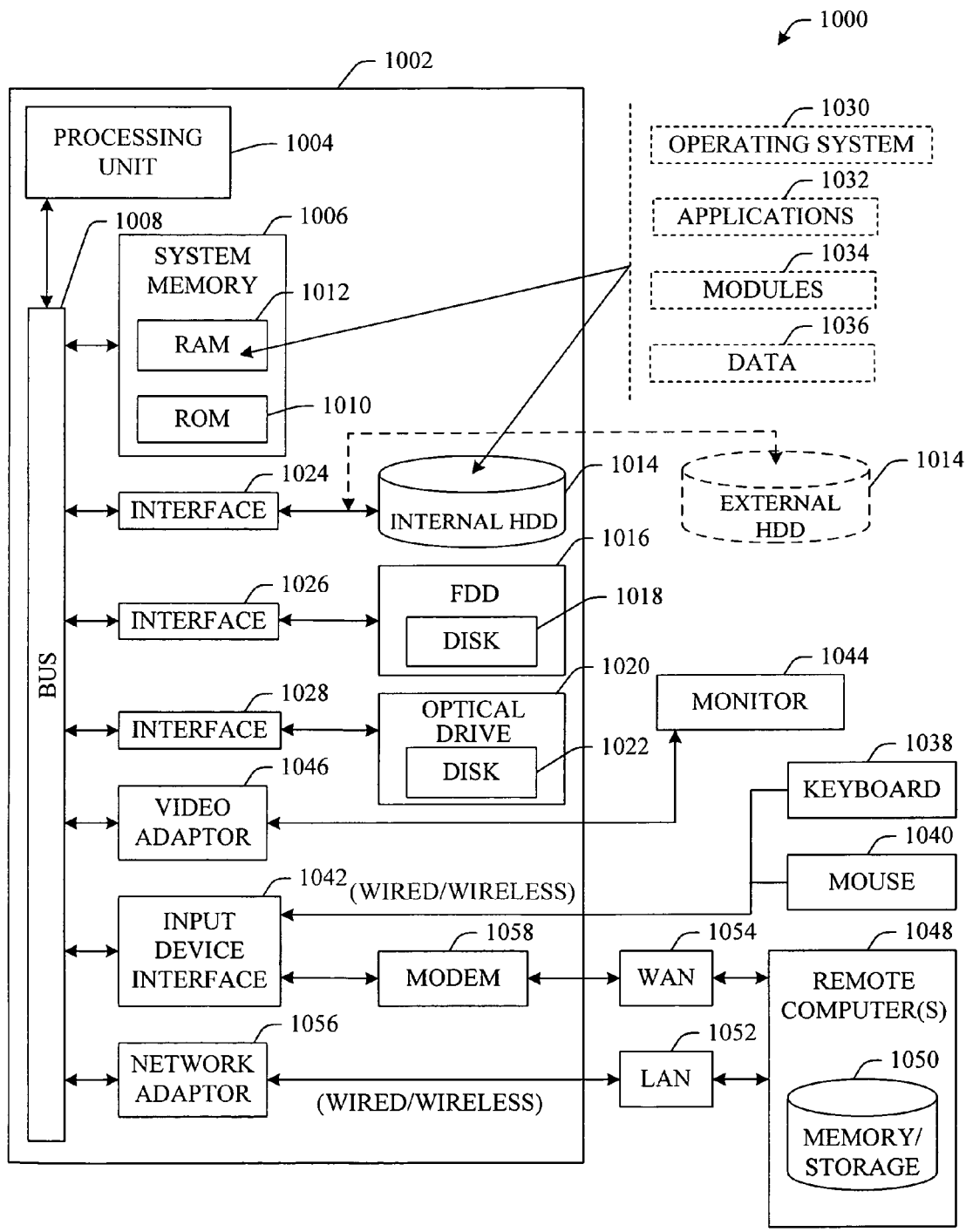
FIG. 10 illustrates a block diagram of a computer operable to execute the disclosed architecture.

Referring now to FIG. 10, there is illustrated a block diagram of a computer operable to execute the disclosed architecture thereby intelligently automating a desired action. In order to provide additional context for various aspects of the subject invention, FIG. 10 and the following discussion are intended to provide a brief, general description of a suitable computing environment 1000 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the invention includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the invention can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
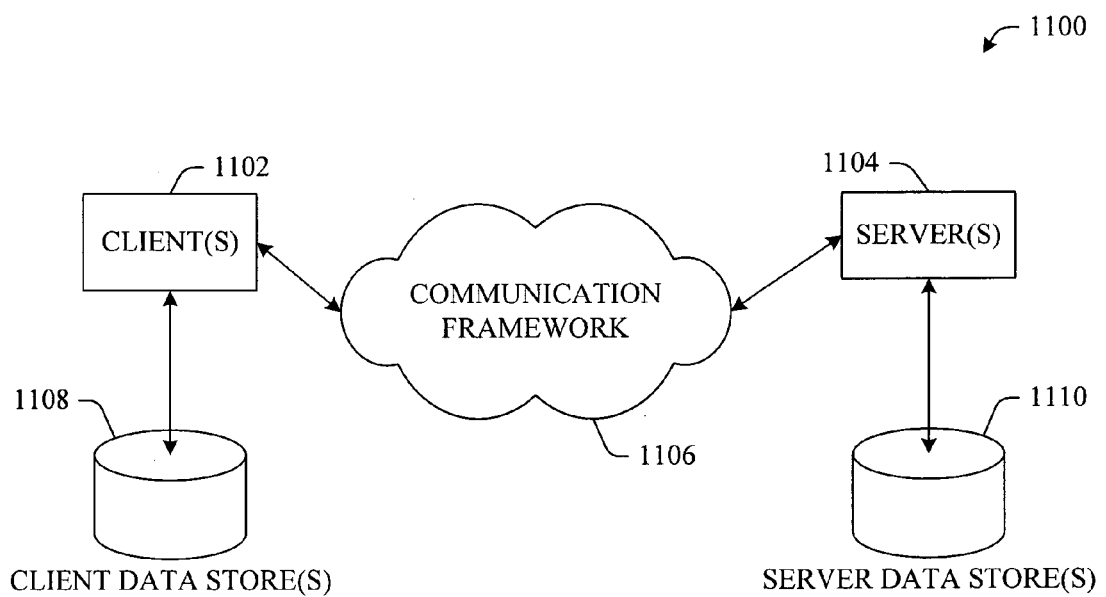
FIG. 11 illustrates a schematic block diagram of an exemplary computing environment in accordance with the subject innovation.

Referring now to FIG. 11, there is illustrated a schematic block diagram of an exemplary computing environment 1100 in accordance with the subject invention. The system 1100 includes one or more client(s) 1102. The client(s) 1102 can be hardware and/or software (e.g., threads, processes, computing devices). The client(s) 1102 can house cookie(s) and/or associated contextual information by employing the invention, for example.

The system 1100 also includes one or more server(s) 1104. The server(s) 1104 can also be hardware and/or software (e.g., threads, processes, computing devices). The servers 1104 can house threads to perform transformations by employing the invention, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A multi-modal multi-lingual mobile device that facilitates automating an action, comprising:
   a detection component that employs a plurality of integrated sensors to obtain at least one criterion from an auxiliary act through passive observation, the auxiliary act is a conversation of a user with an entity that is not the mobile device, wherein the at least one criterion is an environmental context that relates to a weather condition, and a schedule manipulation action is performed at least partially in view of at least one of expected travel complications or venue incompatibility with the weather condition; and
   an analyzer component that evaluates the at least one criterion to infer a user intent and automatically implements the action based at least in part upon operation of a rules-based logic component, wherein the rules based logic component automatically allows execution of the action based at least in part upon satisfaction of a defined rule, and based at least in part upon operation of an implementation component configured to identify an individual, the implementation component using an algorithm together with a desired degree of certainty, and based at least in part upon operation of an artificial intelligence component that comprises a classifier function that maps an input attribute vector $x=(x_1, x_2, x_3, x_4, x_n)$ to a confidence that input associated with the vector belongs to a class, wherein the $x_i$, are input attributes, wherein the confidence that the input belongs to the class is expressed as $f(x)$=confidence(class), and wherein the class to which an input belongs infers the action that the user desires to be automatically performed;

wherein the auxiliary act is not for an explicit purpose of implementing the action.

2. The multi-modal multi-lingual mobile device of claim 1, the action is an identification of an individual and the individual is the entity.

3. The multi-modal multi-lingual mobile device of claim 1, the analyzer component evaluates the criterion based at least upon existing personal information manager (PIM) data.

4. The multi-modal multi-lingual mobile device of claim 1, the detection component includes an inquiry component that facilitates converging on an intention of a user by obtaining the criterion from the user.

5. The multi-modal multi-lingual mobile device of claim 1, the criterion is obtained from a remote data source.

6. The multi-modal multi-lingual mobile device of claim 1, the detection component comprises at least one of an input component, an inquiry component and a sensor component.

7. The multi-modal multi-lingual mobile device of claim 1, the detection component comprises a sensor component.

8. The multi-modal multi-lingual mobile device of claim 7, the sensor component is at least one of an environmental sensor, an image capture sensor, an audio capture sensor and a location detection sensor.

9. The multi-modal multi-lingual mobile device of claim 7, the sensor component comprises an environmental sensor, an image capture sensor, an audio capture sensor and a location detection sensor.

10. The multi-modal multi-lingual mobile device of claim 1, the analyzer component comprises at least one of a learning/reasoning component and a rules-based logic component that facilitates evaluation of the criterion.

11. The multi-modal multi-lingual mobile device of claim 1, further comprising a multi-language component that facilitates translating one of text or speech from a human communication language not comprehendible to the user into a human communication language comprehendible to the user.

12. The system of claim 1, the obtained contextual information includes user conversation with an auxiliary entity and the obtained contextual information includes visual data, temporal data, and user-related physical data.

13. The system of claim 1, the detection component comprises:
an audio recorder component that captures speech of the user interaction with the another user;
a speech analysis component that analyzes the captured speech of the user and the another user and determines an identification of the user and the another user, the identification is part of the contextual data;
a location detection component that determines a physical location of the user during interaction with the another user, the physical location is part of the contextual data; and
a date/time component that determines when the user interacts with the another user, a result of the date/time component determination is part of the contextual data.

14. The multi-modal multi-lingual mobile device of claim 1, further comprising a suggestion component that suggests alternative planning subsequent to the schedule manipulation action performed at least partially in view of the weather condition.

15. A method that facilitates automation of an action based upon a plurality of factors, comprising:
storing, in a memory communicatively coupled to a processor, computer-executable instructions for performing the method of facilitating automation of the action based upon the plurality of factors;
executing the instructions on the processor;
according to the instructions being executed:
obtaining the plurality of factors pertaining to user communication with another user through employment of a communication device, the plurality of factors include an environmental factor, a location factor, and a user state;
analyzing each of the obtained plurality of factors to infer an action that a user desires to be performed based at least in part upon historical analysis;
translating detected language into a language comprehendible to a user of output, wherein either the detected language or the comprehendible language is determined by operation of a GPS system to obtain a present location and language associated with the present location;
automatically scheduling an appointment, wherein scheduling the appointment is based on the analysis of each of the plurality of factors to infer a user intent and to automatically implement the action based at least in part upon a rules-based logic component, wherein the rules based logic component automatically allows execution of the action based upon satisfaction of a defined rule, and based at least in part upon operation of an implementation component configured to identify an individual, the implementation component using an algorithm together with a desired degree of certainty, and based at least in part upon operation of an artificial intelligence component that comprises a classifier function that maps an input attribute vector to a confidence that input associated with the vector belongs to a class, and wherein the class to which an input belongs infers the action that the user desires to be automatically performed;
prompting a user with suggestions prior to commencement of the automatically scheduled appointment, wherein the suggestions are based on prediction of weather at a time of the automatically scheduled appointment; and
adjusting a time of the automatically scheduled appointment in response to the prediction of the local weather.

16. The method of claim 15, further comprising monitoring the user to facilitate determining the action the user desires to be performed.

17. The method of claim 15, wherein voice recognition, text recognition and image recognition determine at least one of identity or communication content.

18. A system for altering personal data for a user based upon a user interaction with a mobile communication device, comprising:
a detection component that employs a plurality of integrated sensors to passively monitor a user to obtain contextual information that relates to the user, at least a portion of the obtained contextual information is derived from user interaction with another user, wherein the detection component is configured for adjusting a time of a scheduled appointment in response to the prediction of the local weather;

an inquiry component for prompting a user with suggestions prior to commencement of the scheduled appointment, wherein the suggestions are based on prediction of local weather at a time of the scheduled appointment;

a multi-language component for translating detected voice data into a language comprehendible to a user, wherein the comprehendible language is identified at least in part by operation of a GPS system to obtain a present location and language and a dialect associated with the present location;

an artificial intelligence component that utilizes a classifier to infer an intention of the user based upon the obtained information, the inference of the intention is made through use of artificial intelligence techniques, wherein the artificial intelligence component uses rules-based logic to automatically prompt execution of the action based at least in part upon satisfaction of a defined rule, and based at least in part upon an implementation component configured to identify an individual, the implementation component using an algorithm together with a desired degree of certainty, and based at least in part upon an artificial intelligence component that comprises a classifier function that maps an input attribute vector to a confidence that input associated with the vector belongs to a class, and wherein the class to which an input belongs infers the action that the user desires to be automatically performed; and an implementation component that performs an action as a function of the inferred intention.

19. The system of claim 18, wherein the action is at least one of modifying an appointment, task, meeting, deadline, or a combination thereof; providing information to one or more parties; synchronizing the mobile communication device with another system; translating a communication; altering personal information manager data; or suggesting modification of or alternatives to the user intention.

* * * * *

UNITED STATES PATENT AND TRADEMARK OFFICE
CERTIFICATE OF CORRECTION

PATENT NO. : 7,778,632 B2
APPLICATION NO. : 11/261039
DATED : August 17, 2010
INVENTOR(S) : David J. Kurlander et al.

Page 1 of 1

It is certified that error appears in the above-identified patent and that said Letters Patent is hereby corrected as shown below:

In column 15, line 9, in Claim 1, delete "$x_1$," and insert -- $x_i$ --, therefor.

Signed and Sealed this
Tenth Day of May, 2011

David J. Kappos
*Director of the United States Patent and Trademark Office*